(12) United States Patent
    Fassbender

(10) Patent No.: US 12,624,981 B2
(45) Date of Patent: May 12, 2026

(54) APPARATUS FOR HANDLING AND/OR MEASURING A LIQUID CONTAINED IN A CONTAINER AND AN EMPTY LEVEL INDICATOR SYSTEM FOR DETECTING A CORRESPONDING EMPTY LEVEL

(71) Applicant: Ecolab USA Inc., Saint Paul, MN (US)

(72) Inventor: Thomas Fassbender, Neuss (DE)

(73) Assignee: Ecolab USA Inc., Saint Paul, MN (US)

( * ) Notice: Subject to any disclaimer, the term of this patent is extended or adjusted under 35 U.S.C. 154(b) by 317 days.

(21) Appl. No.: 18/043,391

(22) PCT Filed: Sep. 8, 2021

(86) PCT No.: PCT/EP2021/074679
§ 371 (c)(1),
(2) Date: Feb. 28, 2023

(87) PCT Pub. No.: WO2022/053497
PCT Pub. Date: Mar. 17, 2022

(65) Prior Publication Data
US 2023/0280202 A1     Sep. 7, 2023

(30) Foreign Application Priority Data

Sep. 9, 2020     (EP) ..................................... 20195337

(51) Int. Cl.
*G01F 23/284* (2006.01)
*G06K 19/06* (2006.01)
*H01Q 1/22* (2006.01)
(52) U.S. Cl.
CPC ......... *G01F 23/2845* (2013.01); *G06K 19/06* (2013.01); *H01Q 1/225* (2013.01); *G06K 2019/06253* (2013.01)

(58) Field of Classification Search
None
See application file for complete search history.

(56) References Cited

U.S. PATENT DOCUMENTS

| | | | | |
|---|---|---|---|---|
| 7,113,125 B2 | 9/2006 | Le Sesne | | |
| 9,031,689 B1 * | 5/2015 | Fink | ........................ | G06F 3/014 |
| | | | | 221/7 |

(Continued)

FOREIGN PATENT DOCUMENTS

| | | | |
|---|---|---|---|
| DE | 102016124733 A1 | 6/2018 | |
| EP | 2868622 A1 | 5/2015 | |

OTHER PUBLICATIONS

International Patent Application No. PCT/EP2021/074679, International Search Report and Written Opinion mailed Dec. 20, 2021, 10 pages.

(Continued)

*Primary Examiner* — Mark A Shabman
(74) *Attorney, Agent, or Firm* — Fredrikson & Byron, P.A.

(57) ABSTRACT

An apparatus (14) for handling and/or measuring a liquid contained in a container (10) includes an elongate component (18) having a free end (20) and being insertable through a container opening (12) of the container (10) into the interior (22) of the container (10) with said free end (20) first and at least a part of an empty level indicator system (28, 30, 32) at the free end (20) of the elongate component (18). A transponder (28) for an RF-detection system (28, 30) of the empty level indicator system (28, 30, 32) is included for detecting an empty level of a liquid in at least one container (10).

12 Claims, 2 Drawing Sheets

(56)  References Cited

U.S. PATENT DOCUMENTS

Figure 1:
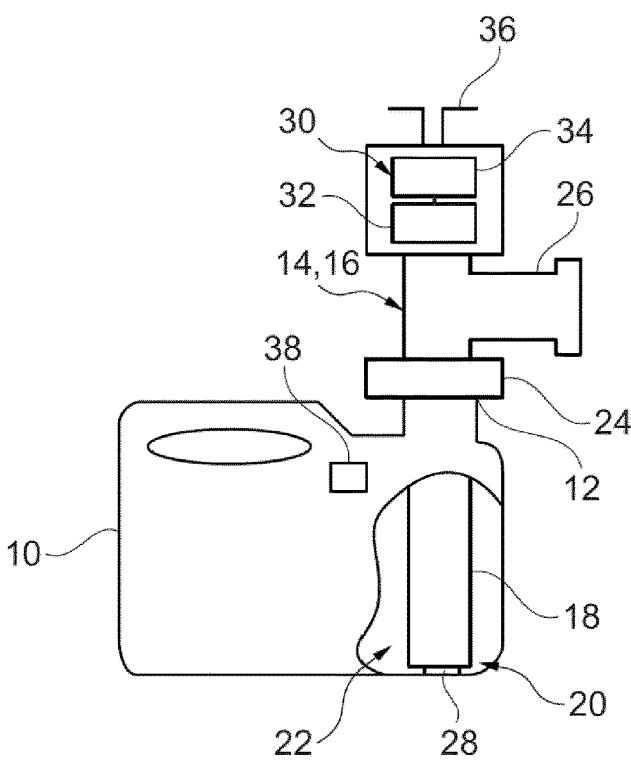

| | | | |
|---|---|---|---|
| 2006/0132351 A1* | 6/2006 | Le Sesne | G01F 23/2845 |
| | | | 342/124 |
| 2012/0240675 A1* | 9/2012 | Farmanyan | G01F 23/268 |
| | | | 73/304 C |
| 2019/0086252 A1* | 3/2019 | Lutz | G01F 23/18 |
| 2019/0271681 A1* | 9/2019 | McKirdy | G06K 19/0723 |
| 2020/0191637 A1* | 6/2020 | Kaibel | G01F 25/20 |

OTHER PUBLICATIONS

EP Patent Application No. 20195337.9, Extended European Search Report mailed Feb. 22, 2021, 7 pages.

* cited by examiner

APPARATUS FOR HANDLING AND/OR MEASURING A LIQUID CONTAINED IN A CONTAINER AND AN EMPTY LEVEL INDICATOR SYSTEM FOR DETECTING A CORRESPONDING EMPTY LEVEL

This application is a 35 U.S.C. 371 national phase filing from International Application No. PCT/EP2021/074679, filed Sep. 8, 2021, which claims priority to European Patent Application No. 20195337.9, filed Sep. 9, 2020. The entire contents of both of these applications are incorporated herein by reference.

FIELD OF THE INVENTION

The invention relates to an apparatus for handling and/or measuring a liquid contained in a container, the apparatus comprising (i) an elongate component having a free end and being insertable through a container opening of the container into the interior of the container with said free end first and (ii) at least a part of an empty level indicator system at the free end of the elongate component.

The invention further relates to an empty level indicator system for detecting an empty level of a liquid in at least one container, the empty level indicator system comprising an RF-detection system and an evaluation unit for detecting the presence of an empty level from the signal of the RF detection system, wherein the empty level indicator system comprises a reader corresponding to the respective transponder of the at least one container.

BACKGROUND OF THE INVENTION

The above mentioned apparatus is e.g. known as suction lance with empty level indicator system based on a float system (empty alarm floater).

As a rule, an existing apparatus such as a suction lance of this type is used on site time and again for changing containers like a canister with a canister opening. Therefore, the connection of the empty level indicator system with the apparatus has the advantage that not all containers have to be equipped with respective components of the empty level indicator system. On the other hand, with a float system, a residual amount of liquid always remains in the container when the empty level indicator system indicates the empty level. The difference Δ between the indicated empty level and the actual empty level can be 20 mm to 40 mm.

Document U.S. Pat. No. 7,113,125 B2 describes a level indicator system for detecting among other levels an empty level of a liquid in a container, the level indicator system comprising an RF-detection system and an evaluation unit for detecting the presence of an empty level from the signal of the RF detection system, wherein the level indicator system comprises a reader corresponding to a respective series of a plurality of transponders, which are arranged at different heights of the container. In this level indicator system RFID tags are used as the transponders and an RFID reader as the corresponding reader.

In this context it should be noted that the term "transponder" is a portmanteau for transmitter-responder. According to the web page of dictionary.com, LLC a transponder is "a radio, radar, or sonar transceiver that automatically transmits a signal upon reception of a designated incoming signal." Main application of such a transponder is to identify and track an object carrying the transponder automatically— preferably in form of one or more RFID tags. When triggered by a signal, e.g. an electromagnetic interrogation pulse, from the nearby reader, the RFID tag transmits a response signal, usually digital data including an identifying number, back to the reader. The RF detection system described in document U.S. Pat. No. 7,113,125 B2 exploits for liquid level detection in addition that the attenuation of the signal by a liquid is much bigger than in pure air/atmosphere.

For applications with an apparatus such as a suction lance, however, often only an empty level indicator is required.

Therefore, the object underlying the present invention is to indicate measures for providing an apparatus for handling and/or measuring a liquid contained in a container with at least part of an empty level indicator for precise determination of the empty level.

SUMMARY OF THE INVENTION

This object is achieved by the invention as defined by the independent claims 1 and 9. The dependent claims detail advantageous embodiments of the invention.

Thus, the object is solved by an apparatus for handling and/or measuring a liquid contained in a container, the apparatus comprising: (i) an elongate component having a free end and being insertable through a container opening of the container into the interior of the container with said free end first and (ii) at least a part of an empty level indicator system at the free end of the elongate component, wherein said part is a transponder for an RF-detection system of the empty level indicator system. Such an RF-detection system usually also comprises a corresponding reader (in addition to this transponder).

In the present case of empty level identification the measuring principle is quite simple: as soon as the transponder is no longer wetted with liquid, the signal changes quite strongly at the reader due to the missing damping of the liquid. This change in signal can be detected and indicates an empty level. In the context of the invention, the transponder is to be understood as a radio transceiver that automatically transmits a response signal upon reception of a designated incoming signal. The coupling between the reader and the transponder is usually achieved by means of high-frequency radio waves or by short-range alternating magnetic fields generated by the reader. These alternating magnetic fields/radio waves are used not only to transmit data but also, if necessary, to supply the transponder with power. To achieve greater ranges, an active transponder with its own power supply is used.

When triggered by a signal, e.g. an electromagnetic interrogation pulse, from the associated nearby reader, the transponder transmits the response signal, usually in form of digital data including an identifying number, back to the reader. The RF detection system with its transponder and reader exploits for the empty level detection that the attenuation of the signal(s) by a liquid is much bigger than in pure air/atmosphere.

According to various aspects of the invention, the transponder is of flat shape. This measure enables the empty level indicator to determine the empty level particularly precisely.

This embodiment provides in particular that the flat shaped transponder is an RFID tag or comprises one or more RFID tags. Usually radio-frequency identification (RFID) uses electromagnetic fields to automatically identify and track tags attached to objects. An RFID tag consists of a tiny radio transponder unit; a radio receiver unit and a transmitter unit. When triggered by an electromagnetic interrogation pulse from a nearby RFID reader, the tag transmits digital data, usually an identifying inventory number, back to the reader. Such an RFID tag is usually a passive transponder that uses the energy of the incoming signal as its power source and has no power supply of its own.

An important application is the use for detecting the empty level of containers with chemicals. Therefore, according to an embodiment of the present invention, the transponder is covered by a chemical resistant cover, especially from PVDF or PP. PVDF (polyvinylidene fluoride or polyvinylidene difluoride) is intended for alkaline chemicals and PP (polypropylene) for acidic chemicals.

In the simplest case, the apparatus could be a kind of dipstick with a transponder at the free end. But in accordance with another aspect of the present invention, the apparatus is a suction lance for emptying the container via the container opening. Such suction lances are very common in connection with containers such as canisters.

According to another embodiment of the present invention, the transponder is arranged in a suction area of the suction lance on a sieve. Such sieves are very common on the suction-side free end of such suction lances.

In accordance with yet another aspect of the present invention, the apparatus further comprises the corresponding reader of the RF-detection system. In addition to the actual reader unit, such a reader also includes a corresponding antenna. In this case the evaluation unit can also be part of the suction lance or a separate unit.

Preferably the apparatus further comprises the evaluation unit for detecting the presence of an empty level from the signal of the RF detection system.

In accordance with another aspect of the present invention, the reader or at least an antenna of the reader is mounted on the elongated component opposite the transponder located at the free end. Preferably the reader comprises an additional antenna for coupling of the reader to one or more additional transponders.

The above mentioned object is furthermore solved by an empty level indicator system for detecting an empty level of a liquid in at least one container, the empty level indicator system comprising an RF-detection system and an evaluation unit for detecting the presence of an empty level from the signal of the RF detection system, wherein the empty level indicator system comprises a reader corresponding to a respective transponder and at least one above described apparatus comprising the respective transponder. The evaluation unit is preferably computer-based, formed by a computer or a computer network. Corresponding data connections between reader and evaluation unit can be wireless and/or wired.

According to one preferred embodiment of the empty level indicator system the reader is also arranged to work together with transponders attached to the container.

According to yet another preferred embodiment of the empty level indicator system the empty level indicator is set up to read out via the reader not only the empty level but also other information from the respective transponder.

Preferably the evaluation unit is arranged to emit an alarm signal for a user when the empty level is reached and/or to emit a pre-alarm signal for the user when a defined higher liquid level than the empty level is reached. In other words, the evaluation unit includes an alarm component that alerts a user by means of a signal like a visual and/or acoustic signal or a notification to a mobile device connected to the corresponding network by an electronic message such as SMS, pager message, etc.

Also in connection with the empty level indicator system, various embodiments provide various characteristics identified in connection with the above mentioned apparatus.

DETAILED DESCRIPTION OF THE INVENTION

Figure 2:
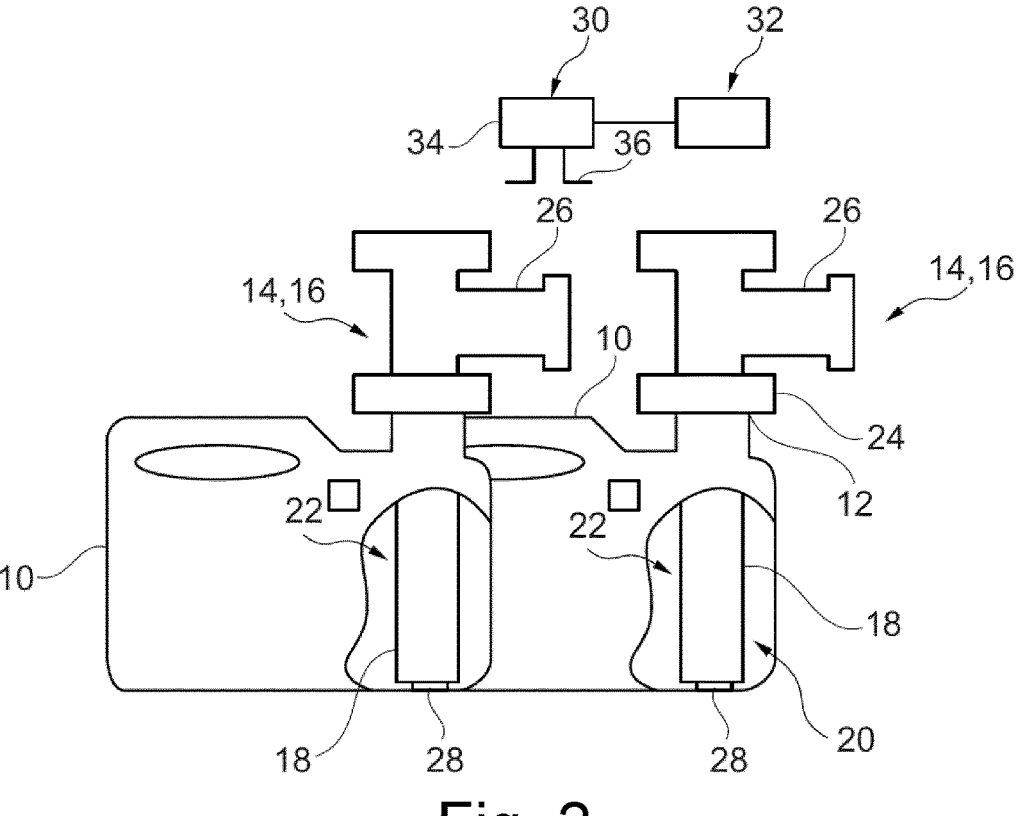
Figure 3:
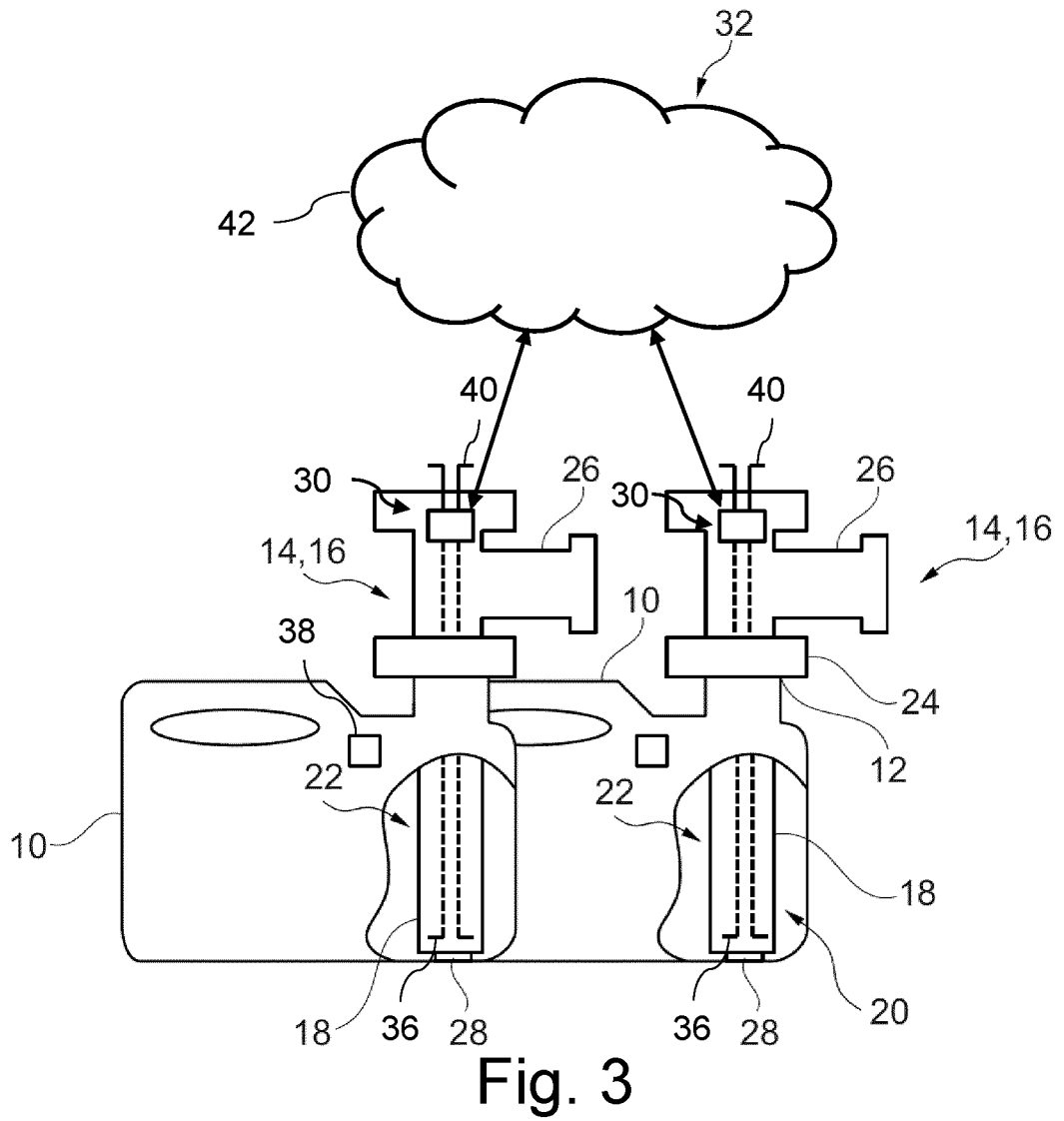

Additional details, features, characteristics and advantages of the object of the invention are disclosed in the figures and the following description of the respective figures, which—in exemplary fashion—show one embodiment and an example of a dispensing system according to the invention. In the drawings:

FIG. 1 shows a storage container and a suction lance according to several preferred embodiments of the invention for emptying said storage container, wherein the suction lance comprises an RF-detection system of an empty level indicator system;

FIG. 2 shows two storage containers and an empty level indicator system for detecting an empty level of a liquid in each of these containers, which indicator system includes a suction lance for each container according to other embodiments of the invention; and FIG. 3 shows two storage containers and an empty level indicator system for detecting an empty level of a liquid in each of these containers, which indicator system includes a suction lance for each container according to yet other embodiments of the invention.

The illustration in FIG. 1 shows a partially cut container 10 for liquids (in the sense of a partial sectional view) with a spout-like container opening 12 and an apparatus 14 for handling and/or measuring a liquid contained in the container 10 mounted on the container opening 12. The container 10 shown in FIG. 1 is a canister. The apparatus 14 is a suction lance 16 for emptying the container 10 via the container opening 12 with an elongate component 18 having a free end 20 and being insertable through the container opening 12 into the interior 22 of the container 10 with said free end 20 first, a mounting part 24 for mounting the apparatus 14 on the container opening 12, a connecting part 26 for connection to a hose, pipe or similar (not shown), and an empty level indicator system 28, 30, 32 for detecting an empty level of liquid in the container 10 with one part 28 of this system 28, 30, 32 at the free end of the elongate component 18, which is the lance component of the suction lance 16. The empty level indicator system 28, 30, 32 comprises an RF-detection system 28, 30 and an evaluation unit 32 for detecting the presence of the empty level from the signal of the RF detection system 28, 30, wherein the RF detection system 28, 30 comprises a transponder 28 and a corresponding reader 30 (RF reader), wherein the transponder 28 is the above mentioned part 28 of the empty level indicator system 28, 30, 32 at the free end 20 of the elongate component 18. In addition to an actual reader unit 34, such a reader 30 also includes a corresponding antenna 36.

The transponder 28 is arranged in a suction area of the suction lance 16 on a sieve at the free end 20, wherein the transponder 28 itself is covered by a chemical resistant cover, e.g. from PVDF or PP. The reader 30 and the evaluation unit 32 together with the connecting part 26 form a head of the apparatus 14, in this case the suction lance 16. This head is positioned above the container 10 when the apparatus 14 is mounted.

In principle, the reader 30 can of course also read the signals of other transponders 28, for example the signals of an additional transponder 38 of the container 10. This additional transponder 38 could, for example, also be designed as RFID tags and provide information about the type of liquid in the corresponding container 10.

The free end 20 of component 18, i.e. the lance part of the suction lance 16, reaches almost to the bottom of the container 10 when mounted. In this way the transponder 28 can actually detect the empty level. If the free end 20 does not reach to the bottom, the transponder 28 detects at least one empty level related to the apparatus 14, namely the level to which the influence of the apparatus 14 reaches. In the case of a suction lance 16 this is a level up to which the container 10 can be emptied by means of this suction lance 16.

The arrangement of container(s) and empty level indicator system described in FIG. 2 essentially corresponds to the arrangement in FIG. 1, so that the differences will be discussed below.

The illustration in FIG. 2 shows a group of containers 10 for liquids (two containers 10 in the shown example) each with a spout-like container opening 12 and an apparatus 14 for handling and/or measuring a liquid contained in the container 10 mounted on the container opening 12 as well as another variant of the empty level indicator system 28, 30, 32.

Each of the apparatuses 14 is also a suction lance 16. In contrast to the embodiment shown in FIG. 1, however, there is now one central reader 30 and one connected evaluation unit 32 for all (both) containers 10 or apparatuses 14. The reader 30 is located centrally above the (two in the example) containers 10 with their handling and/or measuring apparatuses 14 which each have a transponder 28 at their free ends 20.

Each of the two transponders 28 is designed as an RFID tag. The reader 30 now reads an ID of the RFID tag on the one hand and an empty level signal of the respective RFID tag on the other hand, if such an empty level signal is present.

In the example shown in FIG. 2, the apparatus 14 itself requires neither reader 30 nor evaluation unit 32 (as also shown in FIG. 2). However, it is of course possible for a central reader 30 to interact with transponders 28 of such apparatuses 16 which also have their own reader 30 (as shown in FIG. 1).

Last but not least, the underlying measuring principle should be mentioned once again: the decisive factor in this context is that the attenuation of the signal by a liquid is significantly bigger than in pure air/atmosphere. As long as the transponder 28 is completely wetted by liquid, the signal is much smaller than at the moment when the empty level is reached and the transponder 28 at least partially protrudes from the liquid. In this case there is now only air/atmosphere between transponder 28 and reader 30 and the readable signal is suddenly much stronger.

Since transponders 28 can be designed particularly flat (for example as RFID tags), the actual empty level can be determined very well via transponders 28. You only have to make sure that the flat transponder 28 is aligned essentially parallel to the liquid level in the container 10.

The evaluation unit 32 is preferably computer-based or is preferably formed by a computer or a computer network. Corresponding data connections between reader 30 and evaluation unit 32 can be wireless and/or wired. The evaluation unit 32 can also include an alarm component (not shown) that alerts a user by means of a visual and/or acoustic signal or a notification to a mobile device connected to the network by electronic message such as SMS, pager message, etc.

Furthermore, it is envisaged that the evaluation unit 32 will generate a pre-alarm via an additional transponder on the apparatus 14 that registers a slightly higher liquid level than the empty level or by more precise signal evaluation at the transponder 28 which registers the empty level. The pre-alarm indicates to the user that the container 10 is about to be replaced.

The illustration in FIG. 3 shows another group of containers 10 for liquids (two containers 10 in the shown example) each with a spout-like container opening 12 and an apparatus 14 for handling and/or measuring a liquid contained in the container 10 in form of a suction lance 16 mounted on the container opening 12 as well as another variant of the empty level indicator system 28, 30, 32.

The empty level indicator system 28, 30, 32 of FIG. 3 shows some similarities with the apparatus 14 of FIG. 1 and some similarities with the system 28, 30, 32 of FIG. 2. The empty level indicator system 28, 30, 32 of FIG. 3 has a central evaluation unit 32 like the embodiment shown in FIG. 2, but in contrast to the embodiment shown in FIG. 2, each apparatus 14 for handling and/or measuring a liquid contained in the associated container 10 comprises two main components of the corresponding RF-detection system 28, 30, namely the transponder 28 and at least the antenna 36 of the reader 30. In each RF-detection system 28, 30 the antenna 36 of the reader 30 is mounted at/in the elongated component 18 of the corresponding apparatus 14 nearby the associated transponder 28.

Each of the two transponders 28 of the empty level indicator system 28, 30, 32 is designed as an RFID tag. Each reader 30 now reads an ID of the respective transponder 28 on the one hand and an empty level signal of the respective transponder 28 on the other hand, if such an empty level signal is present. The antenna 36 of the reader 30 is formed as a ring antenna 36 and mounted on the elongated component 18 of the suction lance 16 opposite the transponder 28 located at the free end 20. The distance between the antenna 36 and the transponder 28 is at most as large as the maximum extension, e.g. the diameter, of the transponder 28. In the case shown here, the coupling between transponder 28 and the reader 30 is achieved by means of short-range alternating magnetic fields generated by the reader 30. These alternating magnetic fields are used not only to transmit data, but also to supply the transponder 28 with power.

The empty level indicator system 28, 30, 32 further comprises an external RFID reader/writer for providing signal to a pump controller of a pump fluidly coupled to at least one of the apparatuses 14 (not shown).

Also in this example, an additional transponder 38 is provided on the respective container 10. In the present example it is designed as an RFID tag. This additional transponder 38 is arranged, for example, under a label of the respective container 10 and transmits information about the container 10 and/or its contents, i.e. the corresponding medium, as a response signal to the corresponding reader 30. Corresponding information is for example: a batch Code, shelf life information, product information, a name or code, eLabel information, etc. The reader 30 comprises an additional antenna 42 for coupling to this additional transponder 38. This additional antenna 42 is arranged in the area of the mounting part 24 and/or connection part 26 of the apparatus 14.

The evaluation unit 32 is realized by a computer network, especially a cloud computing system 42 (called "cloud" for short). This cloud computing system 42 preferably uses parts of the Internet. Corresponding data connections between reader 30 and evaluation unit 32 can be wireless and/or wired. The level indicator system 28, 30, 32 is preferably adapted to implement at least one of the following applications:

e Lock & key;

shelf life observation;

batch documentation; and product management or at least product monitoring.

It should be noted that, as used in this specification and the appended claims, the singular forms "a", "an" and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

REFERENCE SIGNS

10 container
12 container opening
14 apparatus
16 suction lance
18 elongated component
20 free end
22 interior
24 mounting part
26 connection part
28 transponder
30 reader
32 evaluation unit
34 reader unit
36 antenna
38 transponder, additional
40 antenna, additional
42 cloud

What is claimed is:

1. An apparatus for handling and/or measuring a liquid contained in a container, the apparatus comprising:

an elongate component having a free end and being insertable through a container opening of the container into an interior of the container with said free end first; and at least a part of an empty level indicator system at the free end of the elongate component, wherein said part comprises at least one RFID tag for an RF-detection system of the empty level indicator system, wherein the elongate component comprises a suction lance for emptying the container via the container opening, the suction lance defining a central longitudinal axis extending through the free end, and wherein the at least one RFID tag is arranged in a suction area of the suction lance on a sieve at the free end of the suction lance such that the RFID tag intersects the central longitudinal axis and is arranged to be wetted by liquid when liquid is contained in the container.

2. The apparatus according to claim 1, wherein the at least one RFID tag is covered by a chemical resistant cover.

3. The apparatus according to claim 1, further comprising a corresponding reader of the RF-detection system.

4. The apparatus according to claim 3, further comprising an evaluation unit for detecting the presence of an empty level from a signal of the RF detection system.

5. The apparatus according to claim 1, wherein an antenna of the reader is mounted on the elongated component opposite the at least one RFID tag.

6. The apparatus according to claim 5, wherein the reader comprises an additional antenna for signal coupling of the reader to one or more additional RFID tags.

7. The apparatus according to claim 1, wherein the at least one RFID tag comprises a longer surface and a shorter surface that is normal to the longer surface, and wherein the shorter surface is arranged parallel to the central longitudinal axis and the longer surface is arranged at the sieve normal to the central longitudinal axis.

8. The apparatus of claim 1, further comprising a corresponding reader of the RF-detection system, and wherein the reader is configured to detect an empty level of the container by detecting an increase in attenuation of a signal from the RFID tag.

9. An empty level indicator system for detecting an empty level of a liquid in at least one container, the empty level indicator system comprising:

an elongate component having a free end and being insertable through a container opening of the container into an interior of the container;

at least one RFID tag at the free end of the elongate component, wherein the at least one RFID tag is part of an RF-detection system; and an evaluation unit for detecting the presence of an empty level from a signal of the RF detection system, wherein the empty level indicator system comprises a reader corresponding to the at least one RFID tag, wherein the elongate component comprises a suction lance for emptying the container via the container opening, the suction lance defining a central longitudinal axis extending through the free end, and wherein the at least one RFID tag is arranged in a suction area of the suction lance on a sieve at the free end of the suction lance such that the RFID tag intersects the central longitudinal axis and is arranged to be wetted by liquid when liquid is contained in the container.

10. The empty level indicator system according to claim 9, wherein the reader is arranged to work together with transponders attached to the container.

11. The empty level indicator system according to claim 9, wherein the empty level indicator system is configured to read out via the reader an empty level from the at least one RFID tag.

12. The empty level indicator system according to claim 9, wherein the evaluation unit is arranged to emit an alarm signal for a user when the empty level is reached and/or to emit a pre-alarm signal for the user when a defined higher liquid level than the empty level is reached.

* * * * *